United States Patent [19]

Lloyd

[11] Patent Number: 4,829,575

[45] Date of Patent: May 9, 1989

[54] APPARATUS AND METHODS FOR ANALYZING TRANSITIONS IN FINITE STATE MACHINES

[75] Inventor: Alexander H. Lloyd, Hauxton, England

[73] Assignee: National Research Development Corporation, London, England

[21] Appl. No.: 929,474

[22] Filed: Nov. 12, 1986

[30] Foreign Application Priority Data

Nov. 12, 1985 [GB] United Kingdom ............... 8527913

[51] Int. Cl.⁴ ............................................. G10L 5/06
[52] U.S. Cl. ..................................... 381/41; 381/43; 364/513.5
[58] Field of Search ............................ 381/41–50; 382/1; 364/513.5

[56] References Cited

U.S. PATENT DOCUMENTS

| 4,156,868 | 5/1979 | Levinson | 381/43 X |
| 4,481,593 | 11/1984 | Bahler | 364/513.5 |
| 4,587,670 | 5/1986 | Levinson et al. | 381/43 |
| 4,718,092 | 1/1988 | Klovstad | 364/513.5 |

FOREIGN PATENT DOCUMENTS

| 2579357 | 9/1986 | France | 381/43 |
| 2179483 | 3/1987 | United Kingdom | 381/43 |

OTHER PUBLICATIONS

"Spoken Word Spotting Via Centisecond Acoustic States", R. Bakis, IBM Technical Disclosure Bulletin, vol. 18, No. 10, Mar. 1976.

"An Introduction to Hidden Markov Models", Rabiner et al., IEEE ASSP Magazine, Jan. 1986.

Primary Examiner—Patrick R. Salce
Assistant Examiner—Emanuel Todd Voeltz
Attorney, Agent, or Firm—Cushman, Darby & Cushman

[57] ABSTRACT

In speech recognition words to be recognized may be represented by finite state machines and recognition is based on analyzing transitions through the machines as an utterance occurs. One value which is then required for each state of each machine in a timescale which is compatible with continuous speech recognition is minimum cumulative distance; that is the smallest of values dependent on reaching one of the states from a starting position, considering all possible paths. In the present invention a specially constructed Viterbi engine is provided for calculating cumulative distances at high speed. Latch circuits holding pointers allow a RAM to be read to provide, for a current machine state, both stored cumulative distances of states with transitions to that state and stored penalties corresponding to the transitions. A logic circuit comprising an ALU finds the cumulative distance for each path as far as the current state, selectes the minimum and adds another penalty dependent on the current state. Thus a minimum cumulative distance is provided for storage and for a speech recognition decision making circuit. The process is repeatedly carried out for each state of each machine. The total number of iterations of the engine in reaching each minimum cumulative distance is also held in the RAM and updated by the logic circuit.

22 Claims, 6 Drawing Sheets

Table 1

| INDEX | ITERATION | | | | | |
|---|---|---|---|---|---|---|
| | 0 | 1 | 2 | --- | $i$ | --- |
| $I_1$ | | | | | | |
| $I_2$ | | | | | | |
| $\vdots$ | | | | | | |
| $I_i$ | | | | | | |

Fig. 2

Table 2

| ITERATION | STATE | | | | | |
|---|---|---|---|---|---|---|
| | A | | B | | C | |
| | MCD | TB | MCD | TB | MCD | TB |
| 0 | MAX | MAX | MAX | MAX | MAX | MAX |
| 1 | $CD_{A1}$ | $TB_{A1}$ | $CD_{B1}$ | $TB_{B1}$ | $CD_{C1}$ | $TB_{C1}$ |
| 2 | $CD_{A2}$ | $TB_{A2}$ | $CD_{B2}$ | $TB_{B2}$ | $CD_{C2}$ | $TB_{C2}$ |
| $\vdots$ | | | | | | |
| $i$ | $CD_{Ai}$ | $TB_{Ai}$ | $CD_{Bi}$ | $TB_{Bi}$ | $CD_{Ci}$ | $TB_{Ci}$ |

APPARATUS AND METHODS FOR ANALYZING TRANSITIONS IN FINITE STATE MACHINES

The present invention relates to a Viterbi engine and associated methods for finding minimum cumulative distances in the operation of a plurality of finite state machines. The invention is particularly, but not exclusively, relevant to speech recognition when each of the finite state machines represents a word to be recognised, at present in a restricted vocabulary, and the transitions represent progress through a machine as sounds received are analysed.

One of the objects of the invention is to extract and present, in a timescale which is compatible with continuous speech recognition, quantities required by decision logic which attempts to indicate which word from the vocabulary has been spoken.

In this specification and claims a finite state machine comprises a plurality of states linked by transitions, each state and each transition having corresponding state and transition penalties, respectively, and the minimum cumulative distance of a state being the smallest of values derived, usually by summing, from the state and transition penalties incurred in reaching that state from a starting position, considering all possible paths.

According to a first aspect of the present invention there is provided apparatus for finding minimum cumulative distances in a finite state machine as hereinbefore defined, comprising indicator circuit means for indicating the positions in an external store of the minimum cumulative distances of all originating states, that is states having transitions to a current state whose minimum cumulative distance is to be found, and for indicating the positions in the external store of the transition penalties corresponding to these transitions.

logic circuit means for determining for each transition to the current state a value dependent on the minimum cumulative distance for each originating state and the corresponding transition penalty, for determining the minimum said value for the current state and for determining the minimum cumulative distance for the current state from the minimum said value and the state penalty for the current state, and control circuit means constructed to control the operation of the indicator means to supply minimum cumulative distances and transition penalties to the logic means and to control the logic means, on receipt of a command signal, to determine the minimum cumulative distances of all states.

By using the circuit means of the invention the above mentioned object can be met by a specially constructed hardware device.

Apparatus according to the invention may for example be constructed from discrete proprietary integrated circuits or by customising an integrated circuit, such as a gate array.

The indicator means may comprise first, second and third storage means for storing a cumulative distance pointer, an offset pointer, and a transition penalty pointer, for indicating the locations in the external store of the cumulative distance of the current state, an incremental address of the cumulative distance of a selected originating state from the location of the cumulative address of the current state and the location of the transition penalty corresponding to the selected originating state, respectively. The control means may then obtain a currently required minimum cumulative distance of an originating state from the location in the external store whose address is obtained by using the logic means to add the offset at the location indicated by the offset pointer to the address of the location indicated by the cumulative distance pointer. For this purpose the logic means may comprise an arithmetic logic unit (ALU). The control means may then obtain the corresponding currently required transition penalty from the location indicated by the transition penalty pointer.

The logic means may comprise means for adding minimum cumulative distances and transition penalties and for comparing the relative magnitudes of the resultants of such additions. Such means may comprise the ALU mentioned above.

According to a second aspect of the invention there is provided apparatus for finding minimum cumulative distances in a predetermined number of finite state machines as hereinbefore defined, all having the same number of states and the same pattern of transitions, comprising storage means for storing, in addition to minimum cumulative distances, a number of address offsets one for, and corresponding to, each transition to each state, logic means for determining for each transition to a current state of a selected finite state machine a cumulative distance value dependent on an originating state from which that transition originates and a stored minimum cumulative distance for the originating state, the logic means being arranged to obtain the stored minimum cumulative distances of the originating states from the address of the stored minimum cumulative distance of the current state by using the address offsets, and control means for causing the logic means to determine the said values for each transition to each state of each machine, and select the minimum said value for each state and transfer the minimum values to the storage means as updated values of the stored minimum cumulative distances.

The storage means may store the address offsets at adjacent locations but with markers positioned in the storage means to divide the offsets of each state from those of other states.

According to a third aspect of the invention there is provided a method of finding minimum cumulative distances in a predetermined number of finite state machines as hereinbefore defined, all having the same number of states and the same pattern of transitions, comprising cumulative distances, and a number of address offsets one for, and corresponding to, each transition to each state, determining for each transition to a current state of a selected finite state machine a cumulative distance value dependent on an originating state from which that transition originates and a stored minimum cumulative distance for the originating state, the stored minimum cumulative distances of the originating states being obtained from the address of the stored minimum cumulative distance of the current state by using the address offsets, and determining the said values for each transition to each state of each machine, selecting the minimum said value for each state and storing minimum values as updated values of the stored minimum cumulative distances.

According to a fourth aspect of the present invention there is provided apparatus for use in analysing a plurality of finite state machines comprising logic means for repeatedly carrying out the following operations on each of a plurality of finite state machines, determining a value representative of the current minimum cumulative distance for each state, and determining an indication representative of the number of iterations which have taken place to reach the said state from a starting state while accruing the said minimum cumulative distance, and storage means for storing the said indications and the said minimum cumulative distances at least until new values are determined.

The finite state machines may be of the type which do not allow transition in one direction, and then the logic means may be arranged to determine, in each iteration, the minimum cumulative distances in a single pass from the final state to the first, updating the minimum cumulative distances and the corresponding numbers of iterations which have occurred (known as traceback pointers) while making the pass.

Preferably in speech recognition the state penalties are obtained by using an index to interrogate an area of the storage means which at any time indicates quantities obtained by the analysis of sounds received. Usually these sounds form a "distance" vector representing differences between sounds received and a template of sounds expected.

According to a fifth aspect of the present invention there is provided apparatus for use in analysing a plurality of finite state machines where transitions may occur between finite state machines, comprising storage means for storing representations of a plurality of finite state machines wherein three types of states are stored for each said machine: normal states, a start state and an end state, the normal states being those states required to represent a said machine, the end state having transitions from all normal states which may transit to other finite state machines, and the start state having transitions to all states which may be reached from other finite state machines, and logic means for determining for each said machine a score value dependent on the minimum cumulative distance to the end state, and for storing the smallest of the score values as the score values of the start states of selected ones of the finite state machines, the logic means storing relatively high values for the other start states.

Selection of finite state machines to have start states set with the said smallest minimum cumulative distance may be on a grammatical basis for the vocabulary of words to be recognised.

According to a sixth aspect of the present invention there is provided a method for use in analysing transitions in a plurality of finite state machines where transitions may occur between finite state machines, comprising the steps of storing representations of a plurality of finite state machines wherein three types of states are stored for each said machine: normal states, a start state and an end state, the normal states being those states required to represent a said machine, the end state having transitions from all normal states which may transit to another finite state machine and the start state having transitions to all states which may be reached from other finite state machines, determining, for each said machine, a value representing the minimum cumulative distance to the end state and storing a score value dependent on the smallest of the minimum cumulative distances of the end states as the score values of the start states of selected ones of the finite state machines, relatively high values being stored for the other start states.

The finite state machines may as has been mentioned all have the same number of states and the same pattern of transitions but if so indices and transition penalties differ between machines. The advantage of this arrangement is described below in connection with the "skeleton". Usually it is best to take advantage of the full number of states available for each machine using transition penalties having values which make some transitions rather less likely to occur than others. It would be possible for some indices and/or some penalties to have values such that, in effect, some transitions and/or some states would not exist.

Since the said minimum cumulative distances are formed by additions they increase continually and for this reason it is an important feature of the present invention that at the end of each repetition the smallest minimum cumulative distance found for all models in the previous iteration is used to modify by reduction the minimum cumulative distances stored at the end of each iteration of calculation through all the machines.

However minimum cumulative distances may still reach the maximum value which any location in the storage means can hold and for this reason a further important feature of the invention is that when such a value is reached the logic means ensures that no further additions are made and therefore the number held does not overflow to zero. In addition the logic means is arranged to ensure that the modification by reduction mentioned above is not carried out when the maximum value has been reached.

According to a seventh aspect of the present invention there is provided apparatus for use in analysing transitions through finite state machines in which the minimum path through the states of a plurality of finite state machines is calculated repeatedly for each machine. The invention includes methods equivalent to the fourth and seventh aspects of the invention.

Certain embodiments of the invention will now be described by way of example, with reference to the accompanying drawings, in which.

The Viterbi engine of the invention can in one embodiment be used as part of a speech recogniser. Speech is received by a microphone and may be applied to a series of filters having outputs representative of the power intensity spectrum at frequencies spread across the audio frequency range. Digital values representative of intensities at different frequencies form feature vectors in different time frames and these feature vectors are used in a distance calculation based on probability density functions (PDFs) determined from speech in training sessions for the recogniser apparatus. When the feature vectors are applied to the PDFs, distance vectors are determined which indicate the likelihood of a current sound representing a state which is one of a plurality of states forming finite state machines each representing one of the words in a vocabulary within the capability of the recogniser. A single PDF may be assigned to more than one state in the finite state machines.

The distance vectors are the input for the Viterbi engine and the function of the engine is to provide output signals which enable decision logic to decide which words have been spoken.

Figure 1:
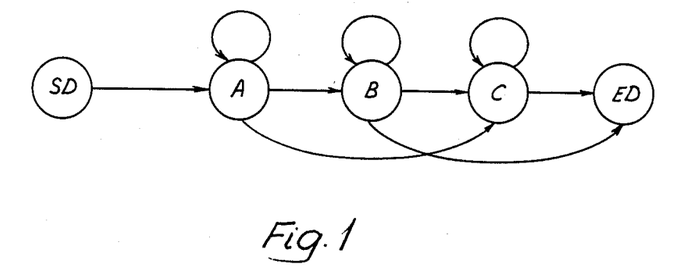
FIG. 1 is a diagram of a finite state machine used in explaining an embodiment of the invention.

The finite state machine of FIG. 1 represents a single word in the vocabulary of the recogniser. It has three normal states A, B and C, although in practice instead of these three states it would typically have many more. In addition the finite state machine has start and end dummy states (SD and ED). The normal model states are separated by transitions shown as arrows and in speech models only left to right transitions or transitions from one state to itself are employed. In a simple example for a word consisting of three sounds the sounds must occur in the left to right order or for the duration of one or more time frames a sound may stay in the same state.

The information supplied to the decision logic by the Viterbi engine concerns maximum likelihood paths through the models and the lengths of these paths. Maximum likelihood is determined by allocating two types of penalties to the models:

transition penalties tp(s1,s2) which are individual to the transitions shown by the arrows between, and back to, the states, and state penalties sp(I,t) which are allocated to a normal state at a particular iteration, t of the Viterbi engine by means of an index I(s), where s indicates the state.

Figure 2:
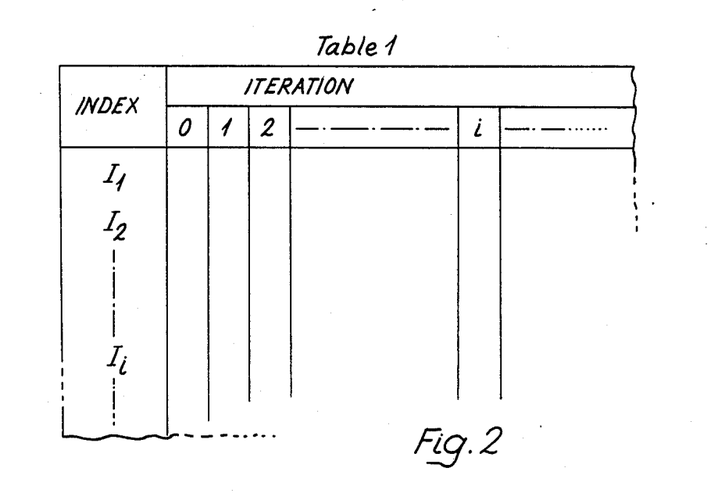
FIG. 2 is the outline of a table indicating how input values to a Viterbi engine according to the invention occur and are accessed.

The transition penalties and indices need not remain constant for the models of a particular Viterbi engine but in this example they are held constant. Table 1 in FIG. 2 shows the way in which the values associated with the indices vary with time. For the first iteration (0) the values associated with the indices $I_1, I_2 \ldots I_i$ are formed by the elements of the distance vector for the first frame (0) and successive distance vectors make up the columns 1, 2 ... i of Table 1. Only the current distance vector is held by the Viterbi Engine.

Figure 3:
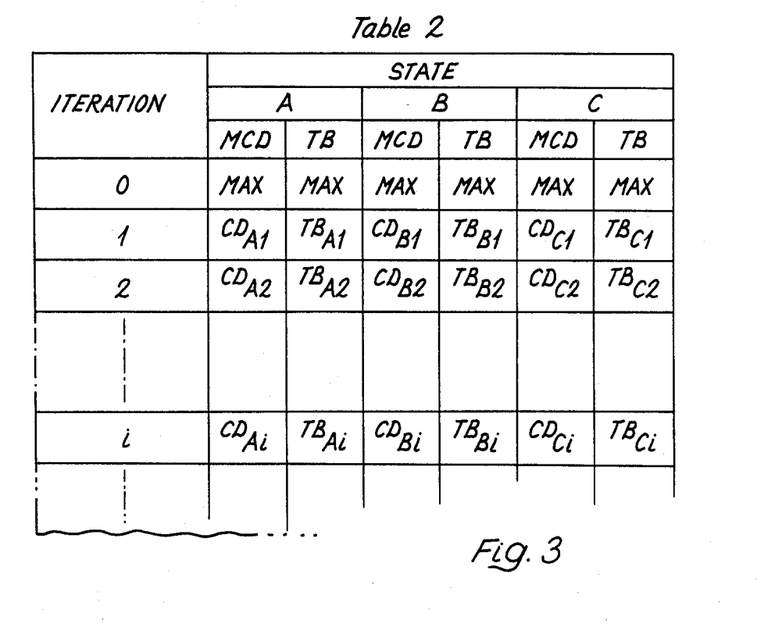
FIG. 3 is a table indicating quantities which are calculated and stored one row at a time by the Viterbi engine.

The way in which the minimum distance through each model is calculated is now described. In each iteration the Viterbi engine calculates a minimum cumulative distance for each normal state starting at the right-most state and progressing left. Thus for iteration 0 and state C the minimum cumulative distance from three paths is determined and in each path a stored cumulative distance for the state at the beginning of the path is added to the transition penalty for that path. The minimum value found is added to the penalty for being in state C obtained using the index allocated to that state and the current distance vector (that is the currently available column of Table 1). The minimum cumulative distance (MCD) found in this way for each state is held in a store which at any time holds one row of a Table 2 in FIG. 3. At the first iteration 0 the values in row 0 are initially set to distances for states A, B and C are available to update the minimum cumulative distances as just described. For example to update the minimum cumulative distance for state C previous cumulative distances for states A, B and C are available. Having decided which is the minimum cumulative distance for state C at iteration 1 this distance is used to update MCD and at the same time a traceback pointer (TB), previously set to 0 at iteration 0, is also updated by incrementing by one the previous traceback pointer for the state from which the new minimum cumulative distance was calculated. Thus at each iteration (t) for each state (s) a minimum cumulative distance (MCD(s,t)) and a traceback pointer (TB(s,t)) are given by $$MCD(s,t) = DV(I(s),t) + \min_x\{tp(x,s) + MCD(x,t-1)\}$$

$$X = \text{Argmin}_x\{tp(x,s) + MCD(x,t-1)\}$$

$$TB(s,t) = TB(X,t-1) + 1$$

where
t refers to the current iteration,
DV(I(s),t) is the element of the distance vector obtained by using an index I(s) for a state s at iteration t,
tp(x,s) is the transition penalty associated with making a transition from state x to state s,
MCD(s,t) is the minimum cumulative distance to state s at iteration t,
TB(s,t) is the traceback pointer associated with state s at iteration t,
$\min_x\{\}$ signifies the minimum of the expression for all valid values of x, and
$\text{Argmin}_x\{\}$ signifies the value of x which causes the expression to be minimised.

As has been mentioned the Viterbi engine finds in each frame the minimum cumulative distance and traceback pointer for each state. For each finite state machine these minimum cumulative distances and the corresponding traceback pointers are passed to the decision logic as data for the logic to indicate which words have apparently been spoken. In addition to the operations described above, the Viterbi engine finds, at the end of each complete iteration through all the models, the minimum of the minimum cumulative distances for all models and in the next iteration subtracts this minimum from all the stored minimum cumulative distance values. This scaling operation is carried out to prevent, as far as possible, the stored cumulative distance values from increasing beyond the size which locations in the store can hold, that is to prevent overflow. From the above equations it can be seen that minimum cumulative distances are formed by addition processes so they inevitably increase. By subtracting a minimum value from all values found the tendency to increase is reduced. However if a stored minimum cumulative distance reaches the maximum size which can be stored it is held at that value without being increased and, in order to prevent misleading cumulative distance values being stored, the subtraction process just described is not carried out once the maximum has been reached. The maximum values automatically exit from the store eventually because at each iteration minimum cumulative distances are stored so eventually eliminating the maximum values.

Figure 4:
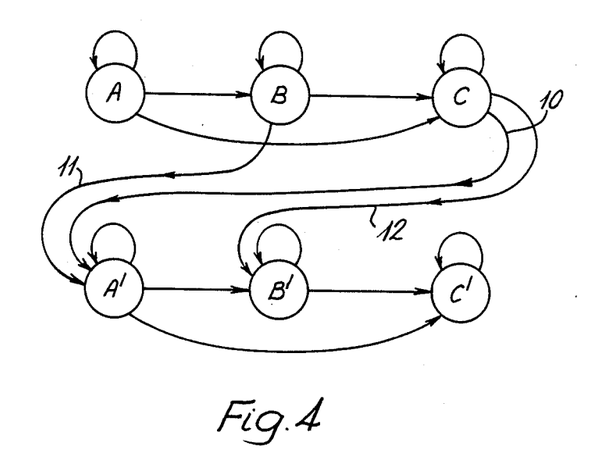
FIG. 4 is an example indicating how transitions between finite state machines representing different words may occur.

The two dummy states of FIG. 1 are used to simplify transitions from one finite state machine, representing one word, to another. In FIG. 4 two different words have similar models A, B and C and A', B' and C', respectively, although as mentioned above the transition penalties and indices are different. A normal transition from the end of the first model to the beginning of the second model is indicated by the arrow 10 from state C to state A'. However transitions such as indicated by the arrows 11 and 12 omitting the last state of the first model or the first state of the second model often occur when parts of words are not pronounced. The transition from state B to state B' also often occurs. To take account of all the transitions which could occur between 64 words in the vocabulary of a typical recogniser would be extremely complicated if carried out on the basis of FIG. 2 but this problem is avoided by the use of the dummy states in a way which is now described. When the Viterbi engine has completed updating the normal states for a word it updates the end dummy state (ED) by finding the minimum cumulative distance for that state in the same way as for a normal state except that there is no state penalty for the end dummy state. A traceback pointer is also stored for the end dummy state and found in the same way as other such pointers except that the traceback pointer corresponding to the minimum cumulative distance selected is not incremented before storage. As each end state is processed a further distance dependent on the value of the traceback pointer is added to the minimum cumulative distance to form a word ending score. A running check is performed to maintain a record of the smallest word ending score and its associated word index. When the Viterbi engine has processed all the models the best word score is used to update the start dummy states (SD) of selected word models, and the other start states are updated to a maximum value. The traceback pointers for all start dummies are set to zero. Start states are selected for updating with the best word score on a grammatical basis according to which words in the vocabulary of words to be recognised can or cannot follow previous words. Where there is no such grammar, or the grammar is ignored, all start states are updated with the best word score. In this way the minimum path and cumulative distance for the transition from any finite state machine to another such machine is recorded for each machine.

The Viterbi engine may be constructed using a general purpose computer or microprocessor but for continuous speech recognition it is preferable to construct a special purpose computer either from discrete integrated circuits or preferably on a single chip having a specially metallised gate or logic array in order to carry out processing in a sufficiently short time. The special purpose computer, an example of which is described later, may for example comprise an arithmetic logic unit with output connected to a number of latches some connected to the address bus of a random access memory and others to the data bus.

Figure 5:
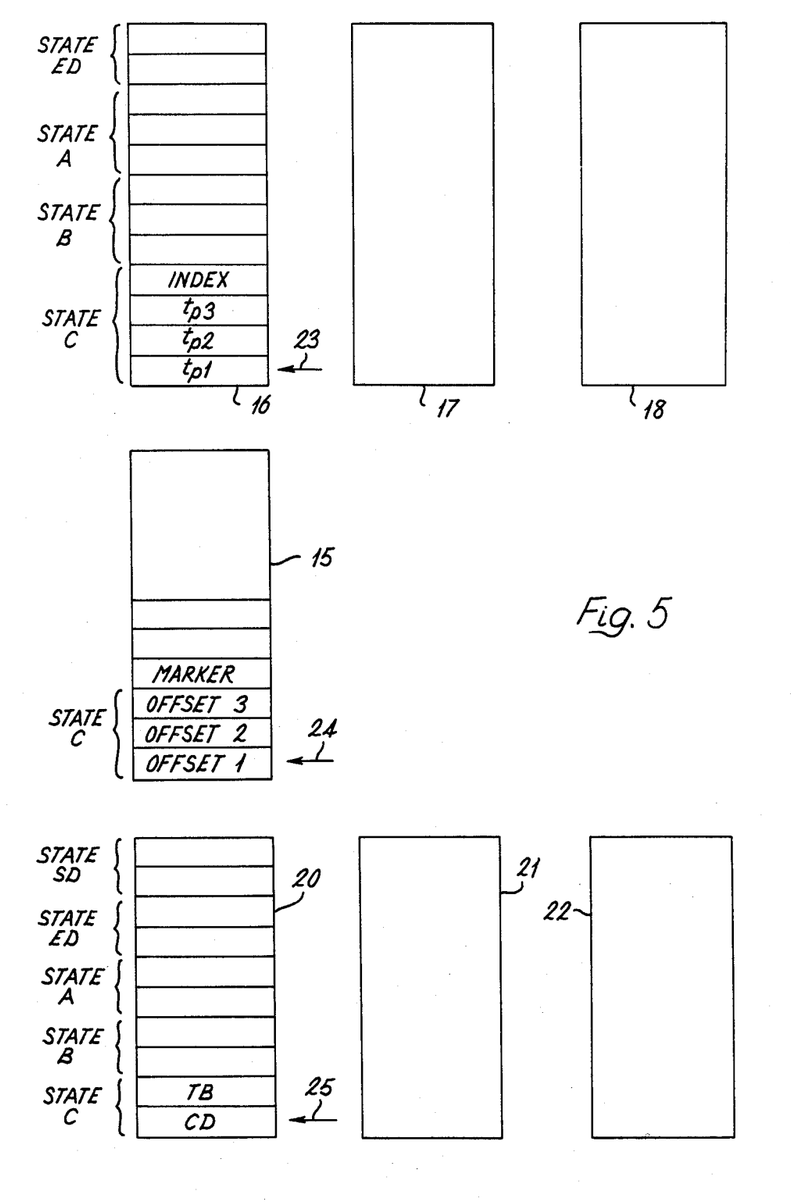
FIG. 5 is a diagram of storage locations in a Viterbi engine according to one embodiment of the invention, FIGS. 6a and 6b form a flow diagram of a Viterbi engine according to the invention, and FIG. 7 block is a block diagram of a dedicated circuit for a Viterbi engine according to the invention.

In order to make a computer as described in the previous paragraph flexible for this application, that is to avoid hard wiring it in such a way that the number of states in the models of finite state machines and the transitions between states cannot be changed, part of a random access memory (RAM) is allocated as a "skeleton" determining the number of states in each model and the transition paths between states. Various portions of the RAM are shown in FIG. 5 and one of these portions 15 is the "skeleton". The portions 16 to 18 contain most of the data for three respective models and there is one similar portion for each model. Taking the model of FIG. 1 to be represented by the RAM portion 16 it will be seen that the three lower locations contain the three entry transfer penalties $t_{p1}$ to $t_{p3}$ corresponding to the transitions to state C from other states and from itself. The fourth location contains the index which allows the state penalty to be found from Table 1. Portion 16 is divided into other locations for the states A, B and ED. The state C has one more location than the states A and B since there are three entry transitions and the state ED has one less location than the state A because there is no penalty associated with being in this state. State SD has no locations in the portion 16 since there are no transitions to it and no associated penalty. As will be described below, in carrying out iterations the Viterbi engine uses pointers to move through the portions 16, 17 and 18 and those of other models in sequence. A pointer is also used to move through the skeleton RAM portion 15 where, for each state, an offset is stored for each transition penalty.

Further portions of the RAM, one for each word, are set aside to store the minimum cumulative distances and traceback pointers associated with each state in each word. Examples of these portions are shown at 20, 21 and 22 in FIG. 5. For the word shown in FIG. 1 the RAM portion 20 is divided into five pairs of locations, one for each state, and containing the cumulative distance and traceback pointer for that state.

In order to update the minimum cumulative distances three pointers indicated by arrows 23, 24 and 25 and held, in the special purpose computer, by latches, are used. The first pointer 23 initially points to the first transition penalty of the last state of the first model to be updated, in this example held by the lowest location in the RAM portion 16. The Viterbi engine has to determine which cumulative distance, at this time to the state C, is a minimum. In order to do so it must find the cumulative distances for each of the paths to the state C and then determine which is the minimum. Having obtained the transfer penalty $T_{p1}$, the arrow 24 points to an offset in the skeleton RAM portion 15 which determines the position of the cumulative distance in the state from which the first transition originates. Thus if the originating state is the current state then the offset is zero and the cumulative distance is that given by the pointer 25. The distance found is stored and the pointers 23 and 24 are incremented by one so that the second transition penalty is added to the cumulative distance given by offset 2 which in this case might be "2" so that the value held at a location with an address two greater than that of the pointer 25 is read, that is the cumulative distance of state B. The distance found in this way is stored if it is smaller than that previously found. The pointers 23 and 24 are again incremented to give the third transition and the cumulative distance to be added to it, and then the distance found is again stored if smaller than the distance already stored. In this way the minimum of the cumulative distance found is stored. The pointers 23 and 24 are again incremented and the pointer 23 then gives the index for finding the appropriate state penalty and the index 24 indicates that the end of iterations for state C has been reached. The minimum cumulative distance found together with its appropriate traceback pointer is now stored in the position given by the pointer 25 and all three pointers are incremented. The cumulative distance for states A and B are then updated in a similar manner as the pointers 23, 24 and 25 are incremented. However, the cumulative distance and traceback pointer for the end state (ED) is obtained when all the states in a model have been updated and, as has been mentioned above, when all models have been updated (except for their start states) then the minimum cumulative distance held by any end dummy state is entered in selected start states (SDs) on a grammatical basis.

The use of the "skeleton" allows the models to be changed in three ways: firstly by changing the offsets the transitions between states are altered, and secondly if the number of offsets between two markers are changed the number of transitions to a state changes. It is this marker which indicates the completion of updating of one state. The number of states in each model can be changed by increasing the number of groups of offsets stored by the RAM portion 15 and the number of models can be increased by allocating more portions such as the portions 16, 17 and 18 and 20, 21 and 22.

Figure 6A:
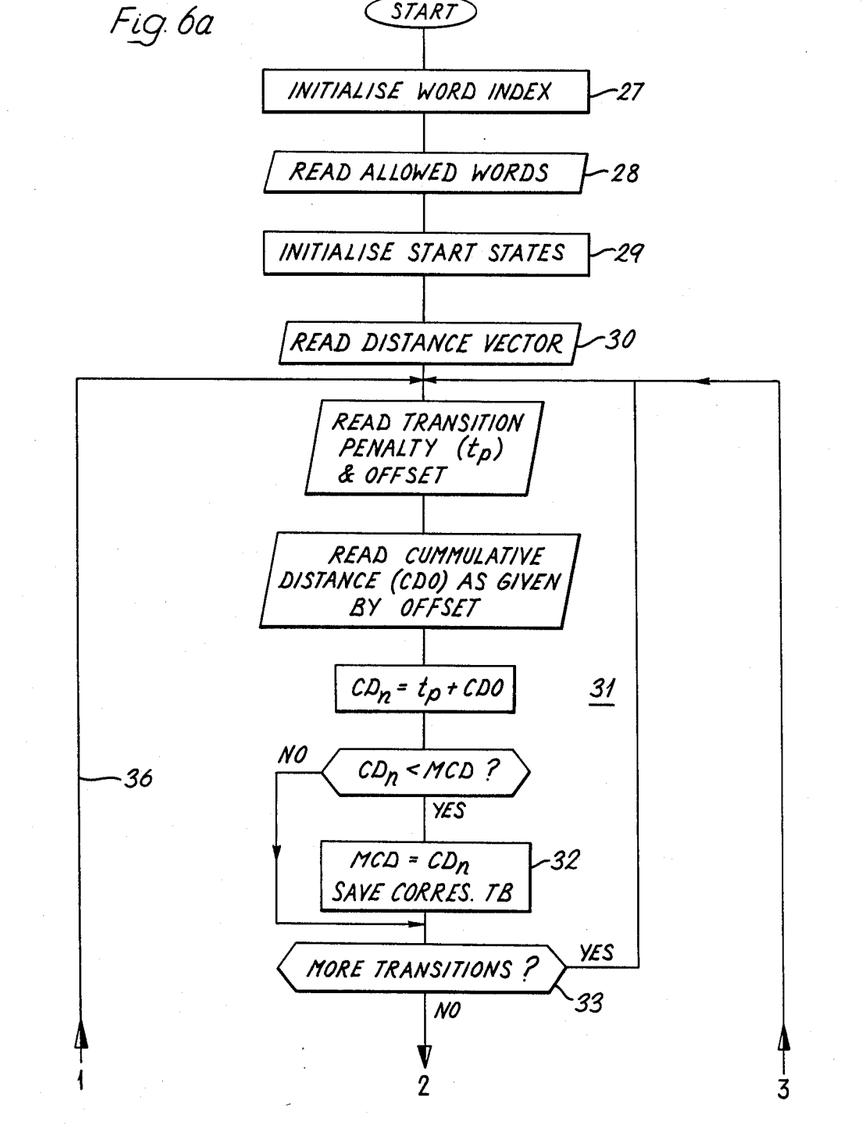
Figure 6B:
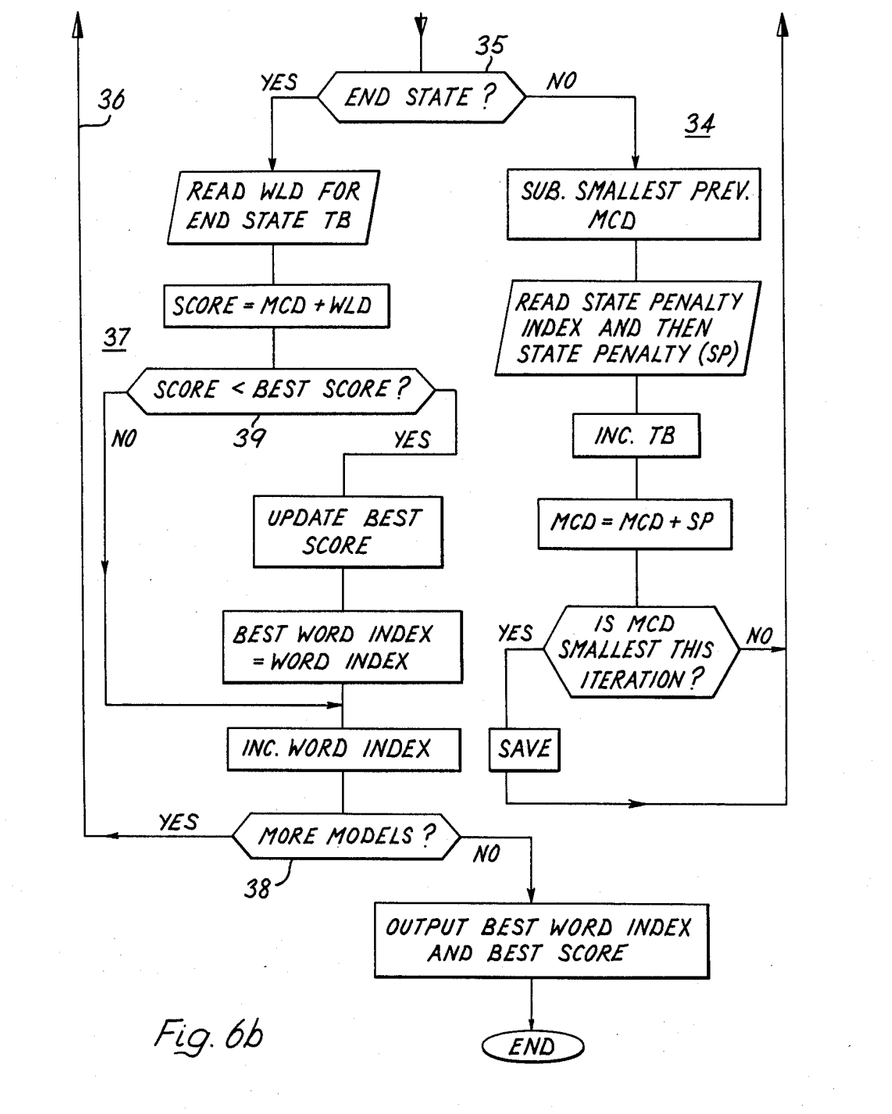

The operation of the flow chart of FIG. 6 which shows one iteration of the Viterbi engine will mainly be apparent from the chart. A word index is initialised in an operation 27, this index holding in turn code numbers for the words of the vocabulary. Next a grammar table is read in an operation 28 to obtain all words allowed following the last iteration. The grammar used in setting up the grammar table connects the words to form a finite state machine and at each node representing the end of a word there are transitions to some other words only as dictated by the grammar. The grammar table comprises a number of groups of entries, each relating to a respective node and giving the indices of the words which are permitted to follow that node. After each iteration a grammar pointer is set to point initially to the first word in the group of words which can follow that node and this pointer is then indexed to point to the other words in the group, thus allowing these words to be read out in the operation 28. Start states for these words are set to the best word score for the previous iteration of the flow chart but otherwise start states are set to a high value (operation 29). In an operation 30 the distance vector is read into the RAM at a location which represents the current column of Table 1. A loop 31 is then entered in which the cumulative distance $CD_n$ for one transition of the last normal state of the first model is calculated. If the value of $CD_n$ is less than a reset value of the minimum cumulative distance for that state or a previously calculated value (MCD), as appropriate, then MCD is set to $CD_n$ in an operation 32. At the same time the corresponding traceback pointer TB for the cumulative distance of the originating state of that transition is saved. A test 33 determines whether there re further transitions to the current state and if not then a loop 34 is followed in which scaling by subtracting the smallest minimum distance from the previous iteration is carried out, the state penalty at that state is added, and the smallest MCD is retained. The traceback pointer previously saved is also incremented. At the end of the loop 34 MCD and TB for that state are retained and the loop 31 is repeated for the next state. In carrying out this repeat MCD is reset for the new state and the values of $CD_n$, $t_p$, CDO and TB relate to the new state. If the new state is an end state as determined by a test 35 then a loop 37 is entered in which a word length distance (WLD) is determined and added to the minimum cumulative distance to give the score for this end state. This word length distance is determined by looking in a word length penalty table held in RAM whose contents are distances, indexed by the traceback pointer (if required word length penalty table can also be used as in index into this look up table thus allowing different penalties to be added for different words). A test 39 is then performed to determine whether the score just computed is the lowest end state score for all the words processed so far in this iteration. If this score is the smallest then the score and the word index are saved. The loop 37 ends with an operation to increment the word index and a test 38 to determine whether more models are to be processed. If so the loops 31 and 34 are repeated as indicated by a jump 36 but again variables are reset as required to represent the new models and new states. When all the models have been processed as indicated by the test 37 the best word index and the best word score are ready for output to the decision maker. At the beginning of the next iteration the best word score is used to update the cumulative distances for the start states of all the words which are allowed to start at this iteration. The start states for the other words are initialised to a high value. The next iteration can now take place starting with the operation 30.

Figure 7:
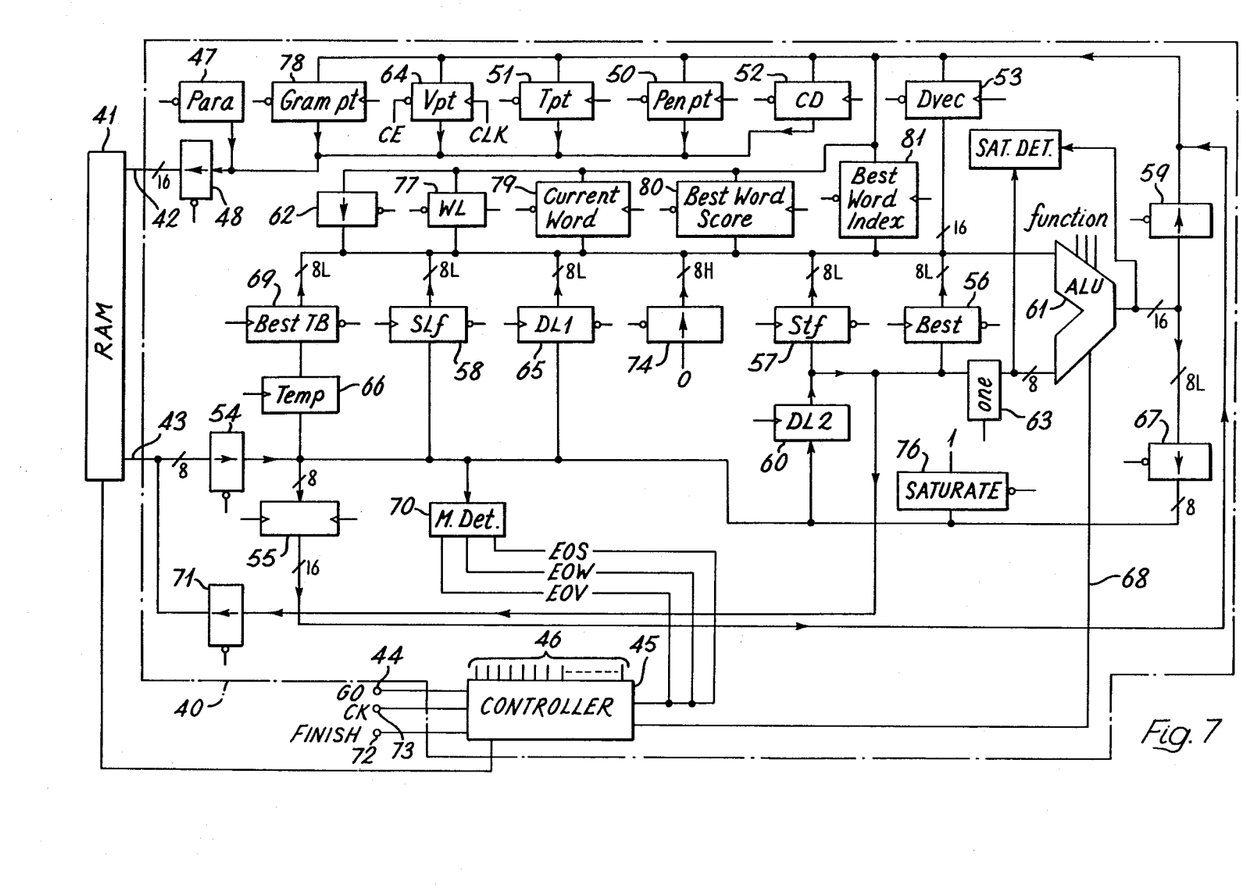

A circuit 40 which may be used for the Viterbi engine is shown in FIG. 7, and may, for example, be constructed from discrete integrated circuits or a customised gate arra. The Viterbi engine is coupled to RAM 41 by means of a 16-bit address bus 42 and 8-bit data bus 43. The RAM 41 includes the areas 15 to 20 of FIG. 5 and similar areas.

When an iteration of the Viterbi engine is to take place a "GO" signal is applied to a terminal 44 connected to a controller 45 which, in one example, comprises a sequencer and a memory (neither shown). In response to the "GO" signal the sequencer cycles through all its states and in so doing addresses the controller memory which outputs a sequence of patterns of binary bits on terminals 46. An enable terminal of every circuit of the Viterbi engine 40 (except the controller 45) is connected individually to a respective one of the terminals 45 so that as the patterns of bits appear different circuits or groups of circuits are enabled.

The first operation uses a parameter base address held permanently by a latch to address a parameter array in the RAM 41. A buffer 48 is enabled by the controller 45 and the RAM is addressed by way of the bus 42. The parameter array holds the addresses of the four pointers 23 (penalty pointer - Penpt), 24 (skeleton pointer - Tpt), 25 (cumulative distance pointer - CDpt) and an index pointer (Dvec) for reading Table 1. In addition a pointer (WL) held in a latch 77 is initialised to point to the start of the word length penalty look up table and the grammar pointer held by a latch 78 is initialised to point to the start of the grammar table. These pointers are read into latches 50, 51, 52 and 53, respectively, each in two serial 8-bit bytes by way of a buffer 54 and a latch 55, the controller 46 again applying the required control signals (from now on in this description the function of the controller will be taken to be understood except where special functions are required). The quantity by which cumulative distances should be reduced is also initialised by reading a further element of the parameter array and entering the result into a latch 58. Further initialisation includes setting to maximum latches 56, 57 and 80 which are to hold the smallest value of a previous cumulative distance plus a transition penalty, the smallest cumulative distance for the current iteration and the best word score for the current iteration, respectively. The current word index is entered into a latch 79 but a latch 81 which is to hold the best word index does not require initialisation since it automatically becomes set to the required value.

The initialisation process proceeds by setting all the start dummy scores either to the start value or to a high value. This may be performed in the following fashion. The grammar pointer is used to access the grammar table and the first allowed word index read from this table. This word index is compared by an arithmetic logic unit (ALU) 61 with the current word index held in the latch 79 and if the two are the same then the start dummy for the current word is set to the initialisation value and the grammar pointer incremented. If a match is not found then the start dummy is set to a high value. The word index is then incremented and the process is repeated until all the start dummies have been initialised. At this point the word index is reset to its start value.

The skeleton pointer 24 in the latch 51 is now used to read the first offset from the RAM 41 which is loaded into a latch 60 by way of the buffer 54. Then the pointer 24 is incremented by application to one input of the ALU 61 through a buffer 62 at the same time as a buffer 63 is used to force a "one" on to another input of the ALU. A buffer 59 loads the incremented pointer 24 back to the latch 51.

The cumulative distance pointer 25 is passed from the latch 52 to the ALU where it is added to the required offset now held in the latch 60 and the result is passed to a latch 64 holding a temporary pointer (Vpt). Vpt is used to read the cumulative distance of the state originating the first transition (for example A to C in FIG. 1) held in the RAM 41, since the offset is the incremental address of this distance in the area 20 from the pointer 25. The distance read is loaded into a latch 65 and Vpt is incremented by one using the buffer 62, the latch 63, the ALU and the buffer 59. Thus Vpt now points at the traceback pointer corresponding to the cumulative distance held by the latch 65 and this pointer is read into a latch 66. Now the penalty pointer 23 is used to read the appropriate transition penalty from the RAM 41 into the latch 60, and the ALU sums the contents of the latches 60 and 65, that is the cumulative distance and the transition penalty and the result is loaded into the latch 60 by way of a buffer 67. The latch 56 normally holds the smallest value cumulative distance found so far for a state but for the first transition it is, as already mentioned, already set to maximum. Thus normally the ALU compares the contents of the latches 56 and 60 and if the contents of the latch 60 is less than the smallest value found so far a flag is set on a control line 68 which causes the controller to read from the latch 60 into the latch 56, and to read the traceback pointer from the latch 66 into a latch 69. Thus the best cumulative distance plus transition penalty found so far and corresponding traceback pointer have been found.

The skeleton pointer is now used to initiate the investigation of another transition to the first state and the cumulative distance plus transition penalty found is checked to determine whether its sum is smaller than the value held in the latch 56. If so it is stored together with the corresponding traceback pointer in the latches 56 and 69. This process continues until the skeleton pointer 24 reaches the first marker which is of a type known as an end of state (EOS) marker. When such a marker appears at the output of the buffer 54 it is detected by a detector 70 and the controller 45 is signalled to continue in the way now described.

The ALU subtracts smallest cumulative distance found in the last iteration, held, as mentioned above, in the latch 58 from the contents of the latch 56 and writes the result into the latch 65. The address indicated by the penalty pointer 23 that is the index for Table 1 is used to write the index into the latch 60 and the ALU adds these contents to the contents of the latch 53 which as a result of the initialisation mentioned above now holds the base address of that area of the RAM 41 which contains the elements of the distance vector (that is the current column of Table 2). The result is written to the latch 64 and becomes the pointer Vpt which is used to read the appropriate element of the distance vector into the latch 60. The ALU adds the contents of the latches 60 and 65 (holding the scaled smallest cumulative distance) to give the updated cumulative distance which is entered into the location indicated by the pointer 25 held in the latch 52. The traceback pointer in the latch 69 is now incremented by one in the ALU and the result entered into the latch 60. The contents of the latch 52 are also incremented by one in the ALU and the address so formed is used to enter the traceback pointer in the latch 60 into the RAM 41 by way of a buffer 71. In order to be ready to process the next state the contents of the latch are again incremented by one.

The operations for one state have now been concluded and the skeleton pointer is again used to read the RAM and the other normal states are processed in a similar way. Eventually the detector 70 finds the marker between the last normal state and the end dummy, this marker being of a type known as end of word (EOW), and when the next state (the end state) is processed the following operations are omitted: the operation employing the index and the operation of incrementing the traceback pointer. Also since the end dummy processing is in the opposite direction through the model (see FIG. 1) in those operations requiring an offset between the pointer 25 and the cumulative distances to be read, the offsets are subtracted instead of incremented. In addition the traceback pointer for this end state is added to the fixed offset (WL) in the latch 77 and a word length penalty is looked up in the word length penalty table in the RAM 41. This penalty is added to the end state score and comparison is then made by the ALU 61 to see if this new score is smaller than the current best word score held by the latch 81. If it is better then the best word score and best word index are updated.

When the next marker after an EOW marker is encountered by the skeleton pointer 24 initialisation of the latches 51, and 56 takes place, and then the next word model is processed. An invalid transition penalty is held in the location above the area 16 of the RAM 41 and when the controller attempts to continue processing after the last word in the vocabulary has been processed, the first transition penalty read out is found by the detector 70 to be the invalid penalty and an end of vocabulary (EOV) control signal reaches the controller signalling the end of an iteration. The controller then writes out the smallest cumulative distance found in this iterating for use in the next iteration and applies a "FINISH" signal to a terminal 72. The decision logic, usually in the form of a microprocessor, connected thereto then carries out an iteration using the cumulative distances and traceback pointers which have been transferred to the RAM 41. No further operations take place in the Viterbi engine until the decision logic or an associated microprocessor applies a further "GO" signal to the terminal 44.

As seen in FIG. 7 the upper input of the ALU 61 is 16-bit while the lower input is 8-bit. Since the outputs of the latches 56 to 58, 65 and 69 are 8-bit, a latch 74 is provided which forces eight zero bits at the high significance side of the upper input of the ALU when these latches pass inputs to the ALU.

A detector 75 is connected at the output of the ALU to detect saturation and to control a buffer 76 so that whenever saturation occurs the output of the buffer 76 is enabled instead of the output of the buffer 67. The buffer 76 contains the maximum possible number while the buffer 67 may contain an overflow. The detector 75 also has an input from the buffer 63 and if this input indicates that the ALU is performing an operation on the maximum value then saturation is also deemed to have been detected and the output of the buffer 76 (that is the maximum value) is used as the result of the operation.

For synchronisation of the various circuits operated by the controller 45 a conventional clock pulse system is operated, with an external clock pulse applied to a terminal 73. The arrows to the right of each latch indicate a clock terminal while the circles to the left indicate an enable terminal.

Several ways of putting the invention into effect have been specifically described above but it will be clear that there are many other ways of doing so. Particularly other data structures, algorithms, model sizes, and hardware may be used. The Viterbi engine and methods of the invention are likely to have other applications than in speech recognition.

I claim:

1. Apparatus for finding minimum cumulative distances in a finite state machine, comprising:
   indicator circuit means for indicating positions in an external store of minimum cumulative distance of all originating states, which are states having transitions to a current state whose minimum cumulative distance is to be found, and for indicating the positions in the external store of corresponding transition penalties, corresponding to these transitions,
   logic circuit means for determining, for each transition to the current state, a value dependent on the minimum cumulative distance for each originating state and the corresponding transition penalty, for determining a minimum said value for the current state and for determining a minimum cumulative distance for the current state from said minimum said value and a state penalty for the current state; and
   control circuit means for controlling an operation of the indicator mean to supply minimum cumulative distances and penalties to the logic means, for controlling the logic means, on receipt of a command signal, to determine the minimum cumulative distances of all states.

2. Apparatus according to claim 1 wherein
   the indicator means comprising first, second and third storage means for storing a cumulative distance pointer, an offset pointer, and a transition penalty pointer, for indicating locations in the external store of the cumulative distance of the current state, an incremental address of a cumulative distance of a selected originating state from the location of a cumulative address of the current state and a location of the transition penalty corresponding to the tramsition between the selected originating state and the current, respectively, and
   the control circuit means is also for obtaining a currently required minimum cumulative distance of an originating state from the location in the external store whose address is obtained by using the logic circuit mean to add the offset at the location indicated by the offset pointer to the address of the location indicated by the cumulative distance pointer.

3. Apparatus according to claim 1 for finding minimum cumulative distances in a number of finite state machines where transitions may occur between the said machines,
   including storage means forming the said external store, and wherein
   the control circuit means is arranged to cause the logic circuit means to determine the minimum cumulative distance of each state of each machine,
   the storage means is arranged to store score values dependent on minimum cumulative distances and transition penalties relating to two categories of additioned states; that is a start state and an end state for each machine, the end state having transitions from all states which may transit to other finite state machines, and the start state having transitions to all states which may be reached from other finite state machines, and
   the logic means is arranged to determine each said machine a value representing the minimum cumulative distance to the end state, and for storing a score value dependent on the smallest of the minimum cumulative distances of the end states as the score values of the start states of selected ones of the finite state machines, the logic means storing relatively high values for the other start states.

4. Apparatus for use in speech recognition according to claim 3, wherein
   a part of the storage means is arranged to store quantities dependent on analysis of sound received at successive instants, and
   the logic means is arranged to obtain the said state penalties by using an index to interrogate the said part of the storage means.

5. Apparatus for finding minimum cumulative distances in a predetermined number of finite state machines, all having the same number of states and the same pattern of transitions, comprising:
   storage means for storing minimum cumulative distances, and a number of address offsets, one for, and corresponding to, each transition to each state,
   logic means for determining, for each transition to a current state of a selected finite state machine, a cumulative distance value dependent on an originating state from which said each transitions originates and a stored minimum cumulative distance for the originating state, and for obtaining the stored minimum cumulative distances of the originating states from the address of the stored minimum cumulative distance of the current state by using the address offsets, and
   control means for causing the logic means to determine said cumulative distance values for each transition to each state of each machine, and selecting a minimum said cumulative distance value for each state and transferring the minimum said cumulative distance values to the storage means as updated values of the stored minimum cumulative distances.

6. Apparatus according to claim 5 wherein the storage means is arranged to store transition penalties and state penalties, and the logic means is arranged to determine each said cumulative distance value by using a process which includes determining the minimum of the sums for each originating state of the stored minimum cumulative distance for that state and the transition penalty from that state to the current state.

7. Apparatus according to claim 6 for use in analysing a plurality of finite state machines, wherein the storage means is arranged to store values dependent on minimum cumulative distances and transition penalties relating to two categories of additioned states; that is a start state and an end state for each machine, the end state having transitions from all states which may transit to other finite state machines, and the start state having transitions to all states which may be reached from other finite state machines, and the logic means is arranged to determine for each said machine a value representing the minimum cumulative distance to the end state, and for storing a score value dependent on the smallest of the minimum cumulative distances of the end states as the score values of the start states of selected ones of the finite state machines, the logic means storing relatively high values for the other start states.

8. Apparatus according to claim 7 wherein the logic means is arranged to select those finite state machines which are to have start states set with a smallest said score value, on the basis of whether one word is likely to follow another.

9. Apparatus according to claim 7 for use in analysing the finite state machines, wherein the logic means is arranged to determine repeatedly values representative of the said minimum cumulative distances of each state of each word and to determine for each state an indication representative of the number of iterations which have taken place to reach that state from a starting state while accruing the said minimum cumulative distance, the logic means is arranged to determine the score value of each end state from the minimum cumulative distance of that state and a value dependent on the said indication for that state, and the storage means is arranged to store at least the current values of the said indications.

10. Apparatus according to claim 9 wherein the logic means is arranged to subtract the smallest minimum cumulative distance found in the previous iteration of determining minimum cumulative distances for all states of all machines from the minimum cumulative distance found in the current iteration to obtain the minimum cumulative distances stored by the storage means, to cease increasing any of the minimum cumulative distances stored by the storage means which reaches the maximum value which the storage means can hold, and to cease subtracting the smallest cumulative distance found in the previous iteration from any stored minimum cumulative distance which has reached the said maximum value.

11. A method of finding minimum cumulative distances in a predetermined number of finite state machines all having the same number of states and the same pattern of transitions, comprising the steps of:

storing minimum cumulative distances and a number of address offsets, one for, and corresponding to, each transition to each state, determining of each transition to a current state of a selected finite machine, a cumulative value dependent on an originating state from which that transition originates and a stored minimum cumulative distance for the originating state, the stored minimum cumulative distances of the originating states being obtained from the address of the stored minimum cumulative distance of the current state by using the address offsets, and determining said cumulative distance values for each transition to each state of each machine, selecting a minimum of said cumulative distance value for each state and storing minimum values as updated values of the stored minimum cumulative distances.

12. A method according to claim 11 including the further step of storing transition penalties and state penalties, and obtaining each said cumulative distance value by using a process which includes determining the minimum of sums for each originating state of the stored minimum cumulative distance for that state and a transition penalty from that state to the current state.

13. A method according to claim 12 for use in analysing a plurality of finite state machines wherein transitions may occur between finite state machines, including storing score values dependent on minimum cumulative distances and transition penalties relating to two categories of additional states; that is a start state and an end state for each machine, the end state having transitions from all states which may transit to another finite state machine and the start state having transitions to all states which may be reached from other finite state machines, determining, for each said machine, a value representing the minimum cumulative distance to the end state and storing a score value dependent on the smallest of the minimum cumulative distances of the end states as the score values of the start states of selected ones of the finite state machines, relatively high values being stored for the other start states.

14. A method according to claim 13 including repeatedly determining values representative of the said minimum cumulative distances of each state of each machine, determining for each state of each machine an indication of the number of iterations which have taken place to reach that state from a starting state while accruing the said minimum cumulative distance for that state, and determining the score value for each end state from the minimum cumulative distance of that state and a value dependent on the said indication for that state.

15. Apparatus for use in analysing a plurality of finite state machines where transitions may occur between finite state machines, comprising storage means for storing representations of a plurality of finite state machines wherein three types of states are stored for each said machine: normal states, a start state and an end state, the normal states being those states required to represent a said machine, the end state having transitions from all normal states which may transit to other finite state machines, and the start state having transitions to all states which may be reached from other finite state machines, and for determining for each said machine a score value dependent on the minimum cumulative distance to the end state, and for transferring to the storage means the smallest of the score values as the score value of the start states of selected ones of the finite state machines, the logic means transferring to the storage means relatively high values for the other start states.

16. A method for use in analysing transitions in a plurality of finite state machines where transitions may occur between finite state machines, comprising the steps of storing representations of a plurality of finite state machines wherein three types of states are stored for each said machine: normal states, a start state and an end state, the normal states being those states required to represent a said machine, the end state having transitions from all normal states which may transit to another finite state machine and the start state having transitions to all states which may be reached from other finite state machines, determining, for each said machine, a value representing the minimum cumulative distance to the end state and storing a score value dependent on the smallest of the minimum cumulative distances of the end states as the score values of the start states of selected ones of the finite state machines, relatively high values being stored for the other start states.

17. Apparatus according to claim 15 wherein the logic means is arranged to select those finite state machines which are to have start states set with the said smallest score value on the basis of whether one word is likely to follow another.

18. Apparatus according to claim 15 for use in analysing the finite state machines, wherein the logic means is arranged to determine repeatedly values representative of the said minimum cumulative distances of each state of each word and to determine for each state an indication representative of the number of iterations which have taken place to reach that state from a starting state while accruing the said minimum cumulative distance, the logic means is arranged to determine the score value of each end state from the minimum cumulative distance of that state and a value dependent on the said indication for that state, and the storage means is arranged to store at least the current values of the said indications.

19. Apparatus according to claim 18 for analysing finite state machines which are of the type which do not allow transition in one direction, wherein the logic means is arranged to determine, in each iteration, the minimum cumulative distances in a single pass from the final state to the first, updating the minimum cumulative distances and the corresponding numbers of iterations which have occurred while making the pass.

20. Apparatus according to claim 18 wherein the logic means is arranged to subtract the smallest minimum cumulative distance found in the previous iteration of determining minimum cumulative distances for all states of all machines from the minimum cumulative distance found in the current iteration to obtain the minimum cumulative distances stored by the storage means, to cease increasing any of the minimum cumulative distances stored by the storage means which reaches the maximum value which the storage means can hold, and to cease subtracting the smallest cumulative distance found in the previous iteration from any stored minimum cumulative distance which has reached the said maximum value.

21. Apparatus for use in speech recognition according to claim 15 wherein the storage means is also for storing transition penalties and state penalties, the logic means is also for determining each said value by using a process which includes determining the minimum of the sums for each originating state of the stored minimum cumulative distance for that state and the transition penalty from that state to the current state, a part of the storage means being arranged to store quantities dependent on analysis of sound received, and the logic means is also for obtaining said state penalties by using an index to interrogate said part of the storage means.

22. Apparatus for finding minimum cumulative distances in a finite state machine, comprising:

indicator circuit means for indicating positions in an external store of minimum cumulative distances of all originating states, which are states having transitions to a current state whose minimum cumulative distances is to be found, and for indicating the positions in the external store of corresponding transition penalties, corresponding to these transitions, the indicator means comprising first, second and third storage means for storing a cumulative distance pointer, an offset pointer, and a transition penalty pointer, for indicating locations in the external store of the cumulative distance of the current state, an incremental address of a cumulative distance of a selected originating state and the current, respectively;

logic circuit means for determining, for each transition to the current state, a value dependent on the minimum cumulative distance for each originating state and the corresponding transition penalty, for determining a minimum said value for the current state and for determining a minimum cumulative distance for the current state from said minimum said value and a state penalty for the current state; and control circuit means for controlling an operation of the indicator means for supplying minimum cumulative distances and transition penalties to the logic means, for controlling the logic means, on receipt of a command signal, to determine the minimum cumulative distances of all states, and for obtaining a currently required minimum cumulative distances of an originating state from the location in the external store whose address is obtained by using the logic current means to add the offset at the location indicated by the offset pointer to the address of the location indicated by the cumulative distance pointer.

* * * * *